(12) United States Patent
Charney et al.

(10) Patent No.: US 8,117,392 B2
(45) Date of Patent: Feb. 14, 2012

(54) METHOD AND APPARATUS FOR EFFICIENT ORDERED STORES OVER AN INTERCONNECTION NETWORK

(75) Inventors: Mark J. Charney, Lexington, MA (US);
Ravi Rajwar, Portland, OR (US);
Pritpal S. Ahuja, Waltham, MA (US);
Matthew C. Mattina, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 773 days.

(21) Appl. No.: 10/691,176

(22) Filed: Oct. 22, 2003

(65) Prior Publication Data
US 2005/0091121 A1 Apr. 28, 2005

(51) Int. Cl.
*G06F 13/00* (2006.01)
*G06F 13/42* (2006.01)

(52) U.S. Cl. ........ 711/122; 711/118; 711/119; 711/141; 711/144

(58) Field of Classification Search .................. 711/118, 711/119, 122, 141, 144
See application file for complete search history.

(56) References Cited

U.S. PATENT DOCUMENTS

| | | | | |
|---|---|---|---|---|
| 5,347,648 A * | 9/1994 | Stamm et al. | ...................... | 714/5 |
| 5,579,504 A * | 11/1996 | Callander et al. | ............. | 711/144 |
| 5,751,995 A | 5/1998 | Sarangdhar | | |
| 5,778,434 A * | 7/1998 | Nguyen et al. | ................. | 711/137 |
| 5,930,822 A | 7/1999 | Chaney et al. | | |
| 6,122,714 A * | 9/2000 | VanDoren et al. | ............. | 711/150 |
| 6,311,253 B1 | 10/2001 | Chang et al. | | |
| 6,334,159 B1 * | 12/2001 | Haupt | .............................. | 710/6 |
| 6,389,468 B1 * | 5/2002 | Muller et al. | .................. | 709/226 |
| 6,418,525 B1 | 7/2002 | Charney et al. | | |
| 6,529,999 B1 | 3/2003 | Keller et al. | | |
| 6,594,734 B1 | 7/2003 | Kyker et al. | | |
| 6,622,214 B1 * | 9/2003 | Vogt et al. | ...................... | 711/141 |
| 7,032,076 B2 | 4/2006 | Sprangle et al. | | |
| 7,058,049 B2 * | 6/2006 | Tanaka et al. | .................. | 370/383 |
| 7,127,562 B2 * | 10/2006 | Dieffenderfer et al. | ........ | 711/146 |
| 7,366,847 B2 * | 4/2008 | Kruckemyer et al. | ......... | 711/144 |
| 7,644,237 B1 * | 1/2010 | Petersen et al. | ................ | 711/146 |

(Continued)

FOREIGN PATENT DOCUMENTS

JP 06-214875 8/1994

OTHER PUBLICATIONS

H. Cheong & A. Veidenbaum, "A Version Control Apporach to Cache Coherence," Proceedings of the International Conference on Supercomputing 89, Jun. 1989, pp. 322-330.

(Continued)

*Primary Examiner* — Sanjiv Shah
*Assistant Examiner* — Samuel Dillon
(74) *Attorney, Agent, or Firm* — Blakely, Sokoloff, Taylor & Zafman LLP

(57) ABSTRACT

A physically distributed cache memory system includes an interconnection network, first level cache memory slices, and second level cache memory slices. The first level cache memory slices are coupled to the interconnection network to generate tagged ordered store requests. Each tagged ordered store requests has a tag including requester identification and a store sequence token. The second level cache memory slices are coupled to the interconnection network to execute ordered store requests in-order across the physically distributed cache memory system in response to each tag of the tagged ordered store requests.

34 Claims, 11 Drawing Sheets

U.S. PATENT DOCUMENTS 7,856,534 B2 * 12/2010 Van Doren et al. ............ 711/141
2002/0087815 A1 7/2002 Arimilli et al.

OTHER PUBLICATIONS

K. Gharachorloo et al., "Memory Consistency and Event Ordering in Scalable Shared-Memroy Multiprocessors," Computer Systems Laboratory, Stanford University, CA 94305, May 28, 1990, pp. 15-26.

I. Tartalia et al., "A Survey of Software Solutions for Maintenance of Cache Consistency in shared Memory Multiprocessors," Proceedings of the 28th Annual Hawaii Int'l Conference on System Sciences, 1995, pp. 272-282.

Jim Handy, The Cache Memory Book, pp. 140-158, Academic Press, Inc. San Diego, CA 1993.

CMOS BiCMOS Data Book, Cypress Semiconducotor, 2 x 4096 x 16 Cache RAM, pp. 2-185-2-192, San Jose, CA. Feb. 1, 1989.

Intel IXP1200 Network Processor Family, The Goundation of a Total Development Environment for Next-Generation Networks, Product Brief, Order No. 279040-001, 2001.

Intel IXP1200 Network Processor Datasheet, pp. 9, 10, & 55, 2001.

John L. Hennessy, David A. Patterson, Computer Architecture, A Quantitative Approach, Third Edition, 2003, Chapter 5: pp. 389-406; Chapter 6: pp. 527-540; Chapter 8: pp. 787-802, Morgan Kaufmann Publishers, San Francisco, California USA.

First Office Action from counterpart China Patent Application No. 200480038473.5, mailed Oct. 10, 2007, 1 page.

Third Office Action from counterpart China Patent Application No. 200480038473.5, mailed Mar. 21, 2008, 1 page.

Notice of Grant of Patent Right For Invention Office Action from counterpart China Patent Application No. 200480038473.5, mailed Apr. 20, 2009, 2 pages.

Office Action from counterpart German Patent Application No. 11 2004 001 984.2-53, mailed Sep. 17, 2007, 6 pages.

Office Action from counterpart German Patent Application No. 11 2004 001 984.2-53, mailed Feb. 19, 2008, 7 pages.

Office Action from counterpart German Patent Application No. 11 2004 001 984.2-53, mailed May 10, 2010, 5 pages.

Cheong, H., et al., "A Version Control Approach To Cache Coherence," Proceeding of the International Conference on Supercomputing 89, pp. 322-330 (18989.06.30).

Notice of Preliminary Rejection from counterpart German Patent Application No. 10-2006-7007706, mailed Aug. 21, 2007, 8 pages.

Office Action from counterpart Japan Patent Application No. 10-2006-7007706, mailed Jan. 12, 2010, 12 pages.

Tartalja, I., et al., "A Survey of Software Solutions for Maintenance of Cache Consistency," Proceedings of the 28th Annual Hawaii International Conference on System Sciences-1995, pp. 272-278.

Gharachorlon, K., et al., "Memory Consistency and Event Ordering in Scalable Shared-Memory Multiprocessors," IEEE, 1990.

* cited by examiner

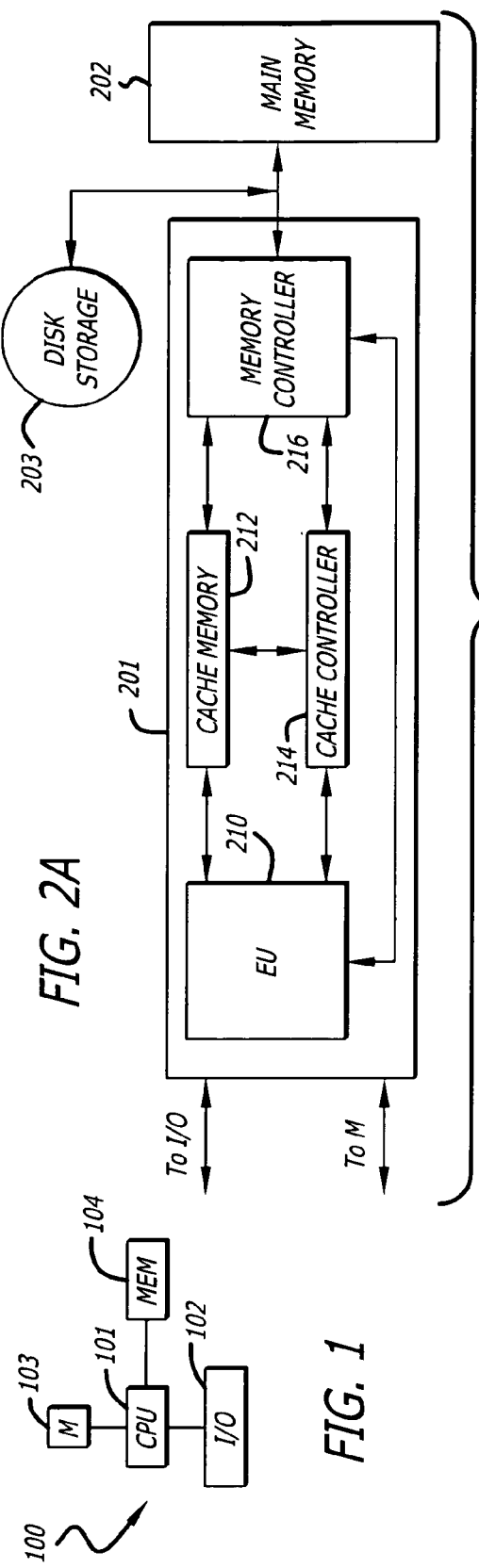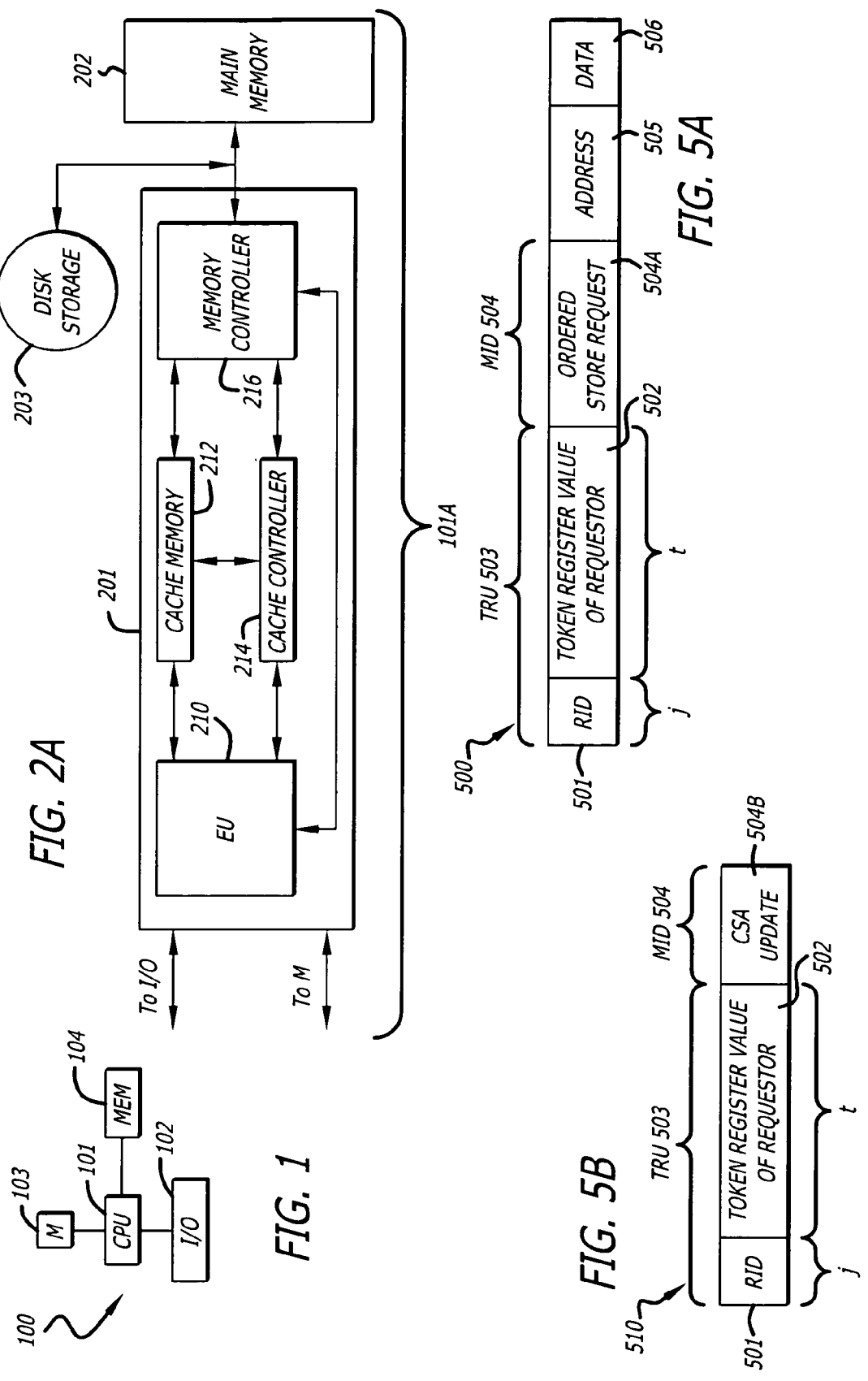

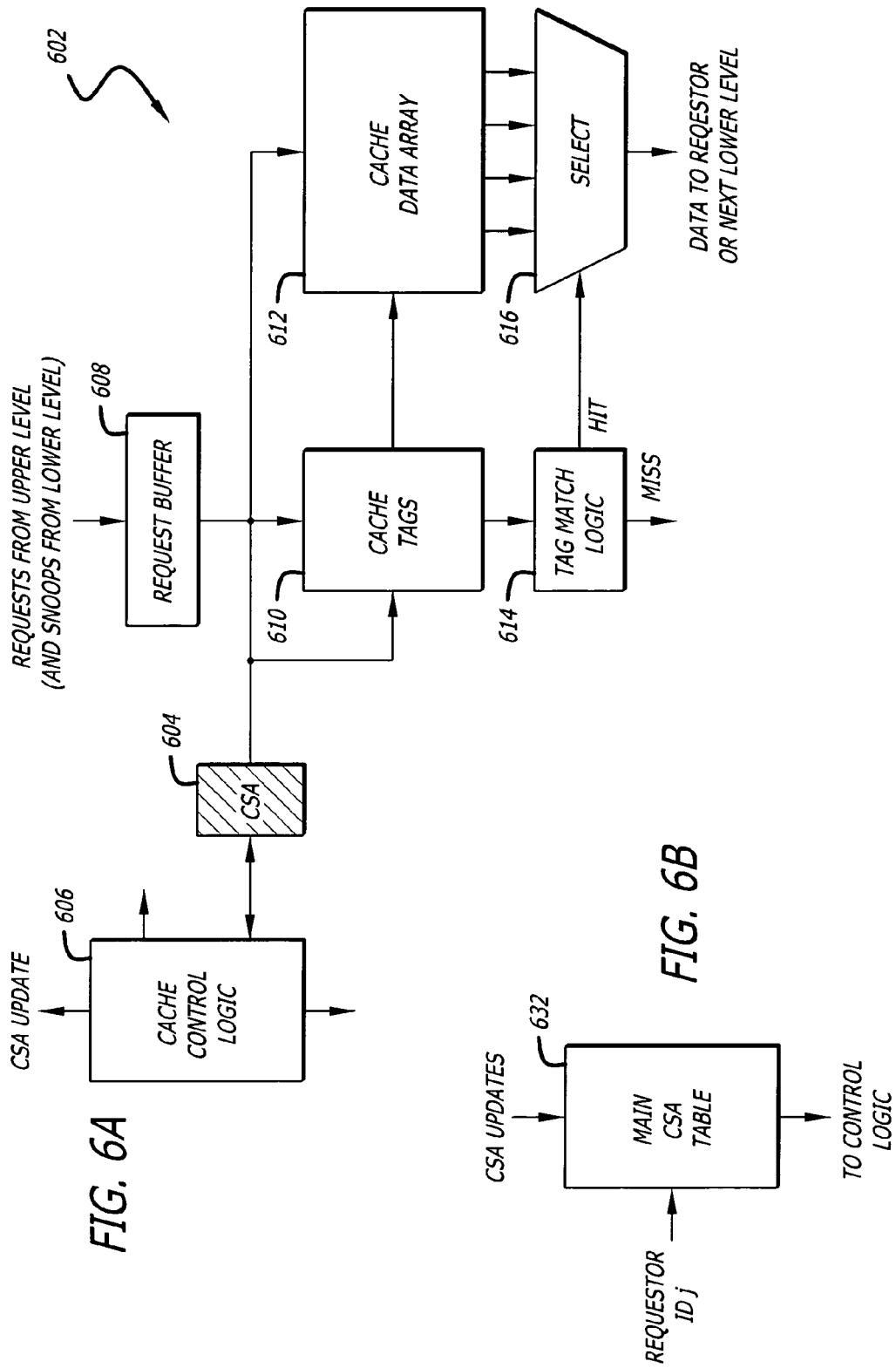

METHOD AND APPARATUS FOR EFFICIENT ORDERED STORES OVER AN INTERCONNECTION NETWORK

BACKGROUND OF THE INVENTION

1. Field of the Invention

The invention relates generally to cache memory management, and specifically to providing ordered stores to a shared distributed cache memory system over an unordered network.

2. Background Information

It is well known to use fast cache memory between a processor and slow main memory in order to improve the average access time into slow main memory. Using cache memory can improve the execution performance of a processor. The cache memory was initially separate from the processor but later became an integral part of the processor as technology improved. With the cache memory being an integral part of the processor, access times to the cache memory could be further reduced.

Multiple levels of cache memory were introduced between the processor and the main memory. Typically, the speed of cache memory increased the closer the cache memory was to the processor but its sized decreased. Put differently, the size of cache memory typically increased and access time increased the further the cache memory was from the processor. However, multiple levels of cache memory complicated the cache management, particularly when instructions branched or jumped to another instruction or address into memory.

A memory controller or cache controller either internal or external to the processor was used to provide cache management of the cache memory between the main memory and the processor. Various cache memory management algorithms were introduced to maximize the use of the cache memory and reduce the number of misses into cache that required the processor to read data/instructions from the slow main memory or write data/instructions out to the slow main memory. Cache coherence protocols were introduced to maintain coherency of data stored in cache memories by tracking the state of data blocks that may be shared. Other cache memory management algorithms have been introduced.

BRIEF DESCRIPTION OF THE DRAWINGS

FIG. 1 illustrates a block diagram of a typical computer system in which the invention may be utilized.

FIG. 2A illustrates a block diagram of a central processing unit in which the invention may be utilized.

FIG. 5A illustrates a diagram of typical fields of a tagged ordered store request.

FIG. 5B illustrates a diagram of typical fields of a CSA update.

FIG. 6A illustrates a block diagram of a cache memory slice.

FIG. 6B illustrates a block diagram of a cache sequence array (CSA).

DETAILED DESCRIPTION

Figure 2B:
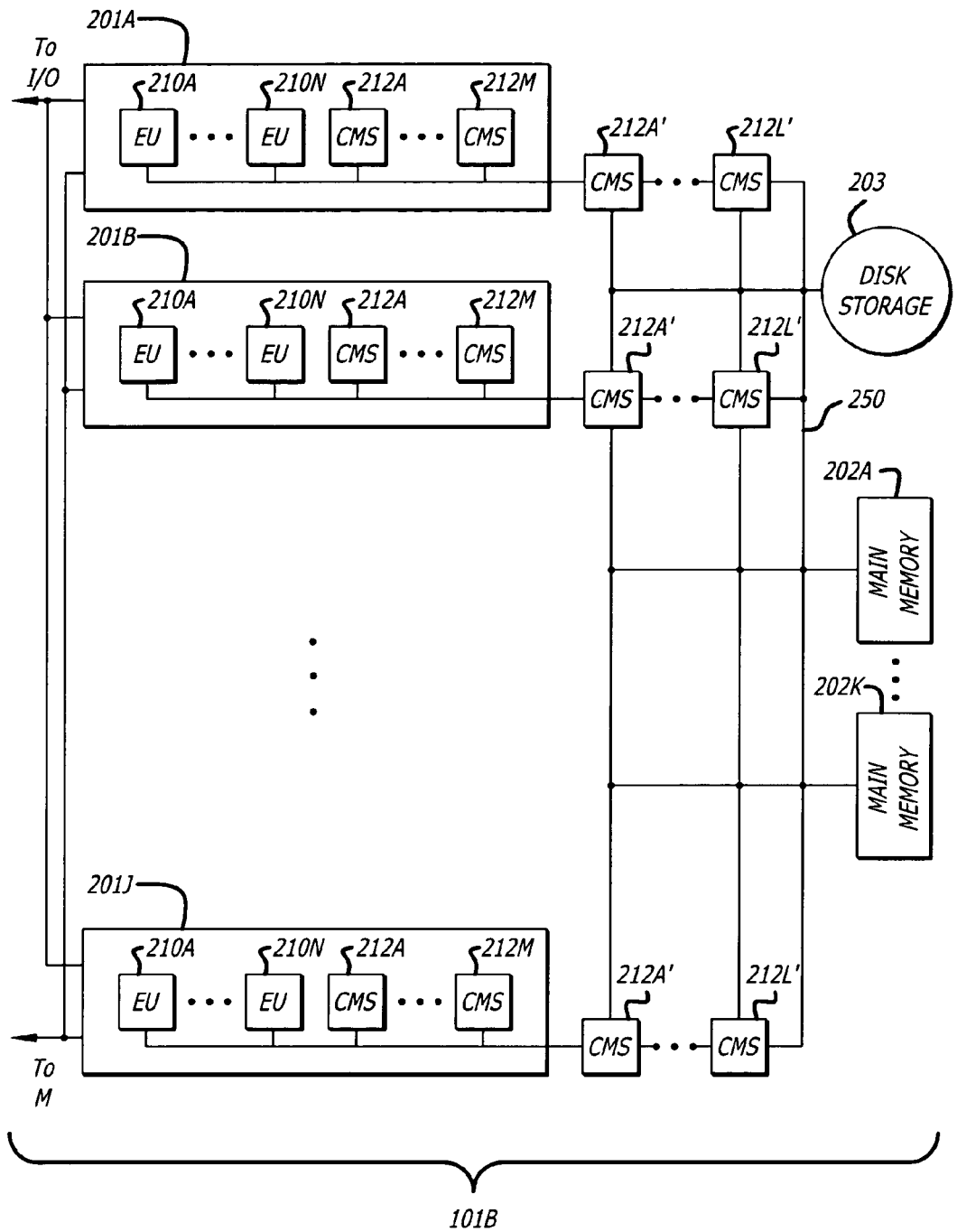
FIG. 2B illustrates a block diagram of a multiprocessor central processing unit in which the invention may be utilized.

In the following detailed description of the invention, numerous specific details are set forth in order to provide a thorough understanding of the invention. However, it will be obvious to one skilled in the art that the invention may be practiced without these specific details. In other instances well known methods, procedures, components, and circuits have not been described in detail so as not to unnecessarily obscure aspects of the invention.

One embodiment of the invention addresses a system with a plurality of processors sharing a logically shared, but physically distributed cache. The plurality of processors communicate to the physically distributed caches over an interconnection network. The interconnection network is an unordered network that does not preserve the ordering of requests from one processor or cache (the "requester") to the same or different caches. Additionally, the messages that one cache may send to another cache over the interconnection network are also not kept in-order by the network. However, the messages may require execution in-order as they are sent out by a requester. These messages may be referred to as ordered requests. Messages that do not require execution in-order may be referred to as non-ordered requests. A store request issued by a requester may be an ordered store request or a non-ordered store request.

A subset of ordered requests is an ordered store request. An ordered store request, described further below, is a store request of a requester that requires execution in-order with respect to other ordered requests issued by the requester. Earlier ordered store requests should be processed before a current ordered store request is processed. That is, the current ordered store request should be processed before later ordered store requests are processed. A non-ordered store request is a store request of a requester that can be executed out of order with respect to other ordered requests of the requester.

The logically shared cache memory may be partitioned so that certain address blocks of cache memory are managed by different chunks of the physically distributed cache memory.

In another embodiment, cache management of the logically shared cache addresses the ordering requirements that certain memory consistency models place on the processing of certain stores from a processor into main memory. Certain stores that require special in-order processing are referred to herein as "ordered stores" or "ordered store requests". In other cases, stores may not require the special in-order processing and are referred to herein as "unordered stores", "unordered store requests", or "non-ordered" store requests". These non-ordered store requests can be executed or processed out of order. The processing of ordered store requests requires that earlier ordered store requests, issued before a current ordered store request, be completely processed before execution occurs of the current ordered store request.

A simple low-performance method of handling ordered store requests from one processor is to inhibit the processor from issuing new ordered store requests until all preceding ordered store requests from that processor have been processed by the cache memory system. However, in a multiprocessor system handling ordered store requests from a plurality of processors is not so simple. The method of handling ordered store requests from a plurality of processors in a multiprocessor system is more complicated.

In embodiment of the invention, the simple low performance method of handling ordered store requests is improved upon to support a multiprocessor system adds a plurality of processors to leverage parallelism in a network of processor with a shared memory system by using a small amount of additional request tracking hardware. In another embodiment of the invention, the parallelism of the networked processors can handle multiple ordered store requests from one processor in the network at the same time or at overlapping time intervals. The one processor need not wait for earlier ordered stores to be completed fully before sending new ordered store requests over the unordered network to the cache system.

Referring now to FIG. 1, a block diagram of a typical computer system 100 in which the invention may be utilized is illustrated. The computer system 100 includes a central processing unit (CPU) 101; input/output devices (I/O) 102 such as keyboard, modem, printer, external storage devices and the like; monitoring devices (M) 103, such as a CRT or graphics display; and memory 104 for storing information. The monitoring devices (M) 103 provide computer information in a human intelligible format such as visual or audio formats. The system 100 may be a number of different systems including a computer system or a network processing system such as a media access controller (MAC).

Referring now to FIG. 2A, a block diagram of a central processing unit 101A in which an embodiment of the invention may be utilized is illustrated. The central processing unit 101A includes a microprocessor 201, a main memory 202 for storing program instructions, and a disk storage device 203 coupled together as shown and illustrated. The microprocessor 201 includes one or more execution units 210, at least one cache memory 212, and a cache controller 214. The microprocessor 201 may include a separate memory controller 216 to control accesses into the main memory 202. In this case, the memory controller interfaces the main memory 202 to the other elements of the microprocessor 201. Ideally, the execution unit 210 reads/writes data into the cache memory 212 without having to directly access the slower main memory 202. That is, it is desirable for the execution unit to avoid misses to the cache memory 212. There are physical limits to the size of the cache memory 212. However, in a multiprocessor system, the system can be designed so that cache memories 212 internal within each processor may be logically shared. In another embodiment, in addition to the one or more internal cache memories within a processor, one or more external cache memories may be provided and logically shared by the plurality of processors over an interconnection network in a multiprocessor system.

Disk storage device 203 may be a floppy disk, zip disk, DVD disk, hard disk, rewritable optical disk, flash memory or other non-volatile storage device. The microprocessor 201 and the disk storage device 203 can both read and write information into memory 202 over a memory bus. Thus, both the microprocessor 201 and the disk storage device 203 can alter memory locations within memory 202 during program execution. In order for the disk storage device 203 to do this directly, it includes a disk controller with direct memory access, which can perform stores into memory and thereby modify code. Because the controller can directly access the memory it is an example of a Direct Memory Access (DMA) agent. Other devices having direct access to store information into memory are also DMA agents. Memory 202 is typically a dynamic random access memory (DRAM) but may be other types of rewritable storage.

Upon initial execution of a program stored in the disk storage device 203 or stored in some other source such as I/O devices 102, the microprocessor 201 reads program instructions and data stored in the disk storage device 203 or other source and writes them into memory 202. One or more pages or fractions thereof of the program instructions stored within memory 202 are read (i.e. "fetched") by the microprocessor 201 for storage into an instruction cache (not shown in FIG. 3). Some of the program instructions stored in the instruction cache may be read into an instruction pipeline (not shown) for execution by the microprocessor 201. One or more pages or fractions thereof of the data stored within memory 202 may be read (i.e. "fetched") by the microprocessor 201 for storage into a data cache. In another embodiment, both instructions and data may be stored into the same cache memory.

Referring now to FIG. 2B, a block diagram of a multiprocessor system 101B in which an embodiment of the invention may be utilized is illustrated. The multiprocessor system 101B may be a multiprocessor central processing unit. The multiprocessor system 101B includes a plurality of processors 201A-201J. Each of the plurality of processors 201A-201J includes one or more execution units 210A-201N. An execution unit may also be referred to as a core. Each of the plurality of processors 201A-201J may further include one or more levels of internal cache memory slices (CMS) 212A-212M to couple to the one or more execution units 210A-210J. Each of the plurality of processors 201A-201J may couple to I/O devices and or monitoring devices.

The multiprocessor system 101B further includes one or more levels of external cache memory slices (CMS) 212A'-212L' coupled together through an interconnection network 250 and to the plurality of processors 201A-201J. The multiprocessor system 101B may further include one or more main memories 202A-202K coupled to the interconnection network 250 and a disk storage device 203 coupled to the interconnection network 250.

The processors 202A-201J, the cache memory slices 212A'-212L', and the disk storage device 203 may directly read and write information into the main memories 202A-2002K. That is, the main memories 202A-2002K can be shared by the processors 202A-201J, the cache memory slices 212A'-212L', and the disk storage device 203. Additionally, messages may be communicated between the processors 202A-201J, the main memories 202A-2002K, the cache memory slices 212A'-212L', and the disk storage device 203 through the interconnection network 250. By using messaging over the interconnection network 250, in-order execution or processing of ordered store requests in the multiprocessor system 101B may be provided.

Figure 3A:
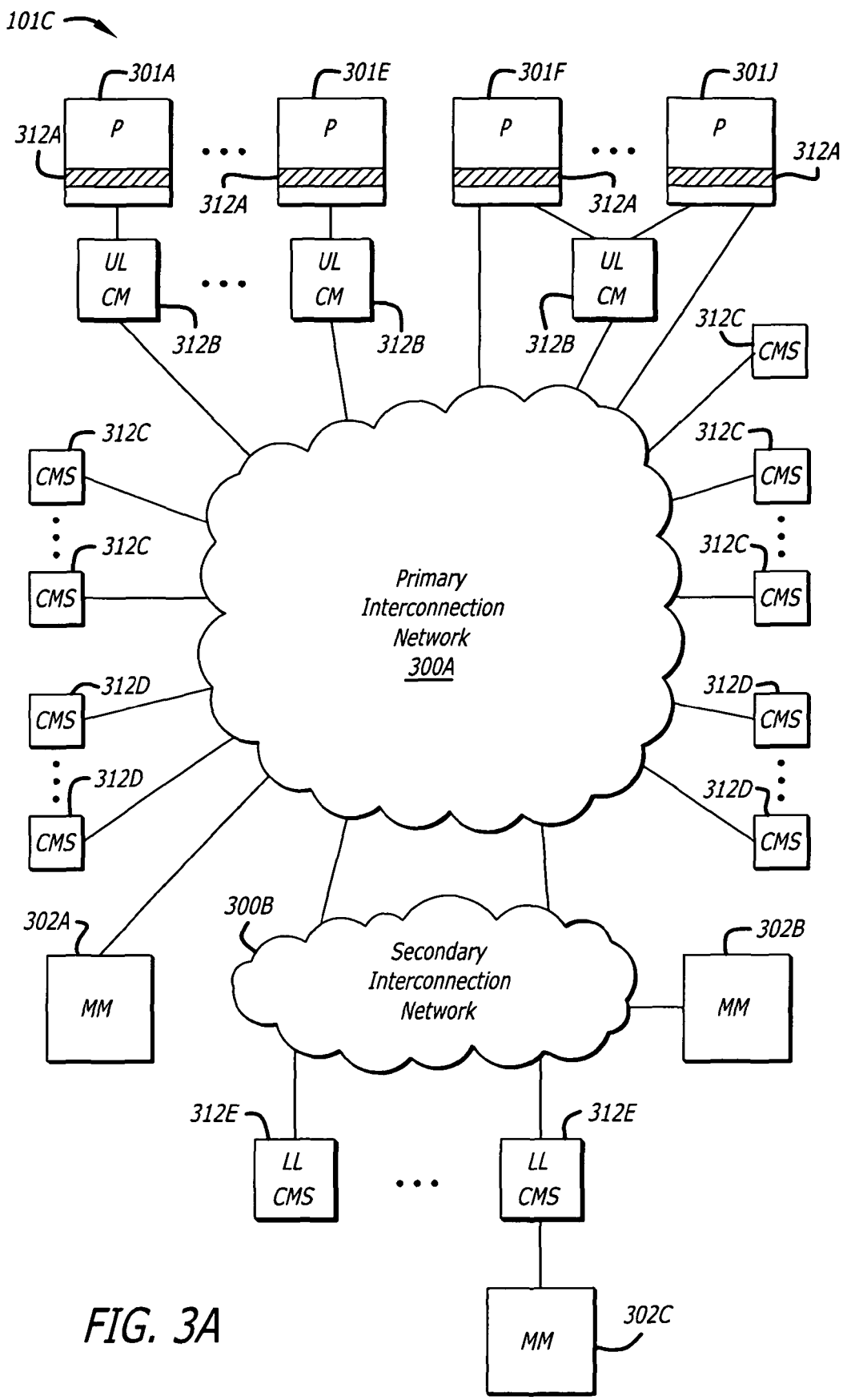
FIG. 3A illustrates a block diagram of an embodiment of a multiprocessor system in which the invention may be utilized.

Referring now to FIG. 3A, a block diagram of a multiprocessor system 101C is illustrated. The multiprocessor system 101C may include a primary interconnection network 300A, a plurality of processors 301A-301J each having an internal cache memory 312A, one or more upper level cache memories 312B coupled between the plurality of processors 301A-301J and the interconnection network 300A, a level of cache memory slices 312C coupled to the interconnection network 300A, another level of cache memory slices 312D coupled to the interconnection network 300A, and yet another level of cache memory slices 312E coupled to the primary interconnection network 300A through a secondary interconnection network 300B.

The multiprocessor system 101C may further include one or more main memories 302A, 302B, and/or 302C. The main memory 302A may couple directly to the primary interconnection network 300A. The main memory 302B may couple to the primary interconnection network 300A through the secondary interconnection network 300B. The main memory 302C may couple to a lower level cache memory slice 312E and to the primary interconnection network 300A through the secondary interconnection network 300B.

The internal cache memory 312A, the one or more upper level cache memories 312B, the level of cache memory slices 312C, the level of cache memory slices 312D, and the level cache memory slices 312E may form an embodiment of a physically distributed multi-level cache memory system. With main memory 302A, 302B included with the cache memory slices, an embodiment of a physically distributed multi-level memory system is provided.

The processors, the cache memory slices, and the main memory may be considered to be nodes of the interconnection network. Messages may flow across the interconnection network from one node to another or be broadcast from one node to all others. The topology of the multiprocessor system 101C and the interconnection networks 300A and 300B may be a bus network topology, a tree network topology, a ring network topology, a grid or mesh network topology, a torus network topology, a hypercube network topology, a full connection topology or a combination thereof.

The interconnection networks 300A and 300B may be wire traces routed over an integrated circuit, busses routed on the same integrated circuit, and/or one or more switches between functional blocks of the same integrated circuit. Alternatively, interconnection networks 300A and 300B may be wire traces routed between integrated circuits, busses between integrated circuits and/or one or more switches between integrated circuits. A switch, bridge, or router (not shown) may be used to interconnect the primary interconnection network 300A and the secondary interconnection network 300B so that message may be passed back and forth accordingly.

As messages flow across the interconnection network, they may experience different delays when being routed from node to node or from node to all nodes. These differing delays may cause an unordered sequence of message transfer. That is, the interconnection network is an unordered network when processing in-order storage requests.

Figure 3B:
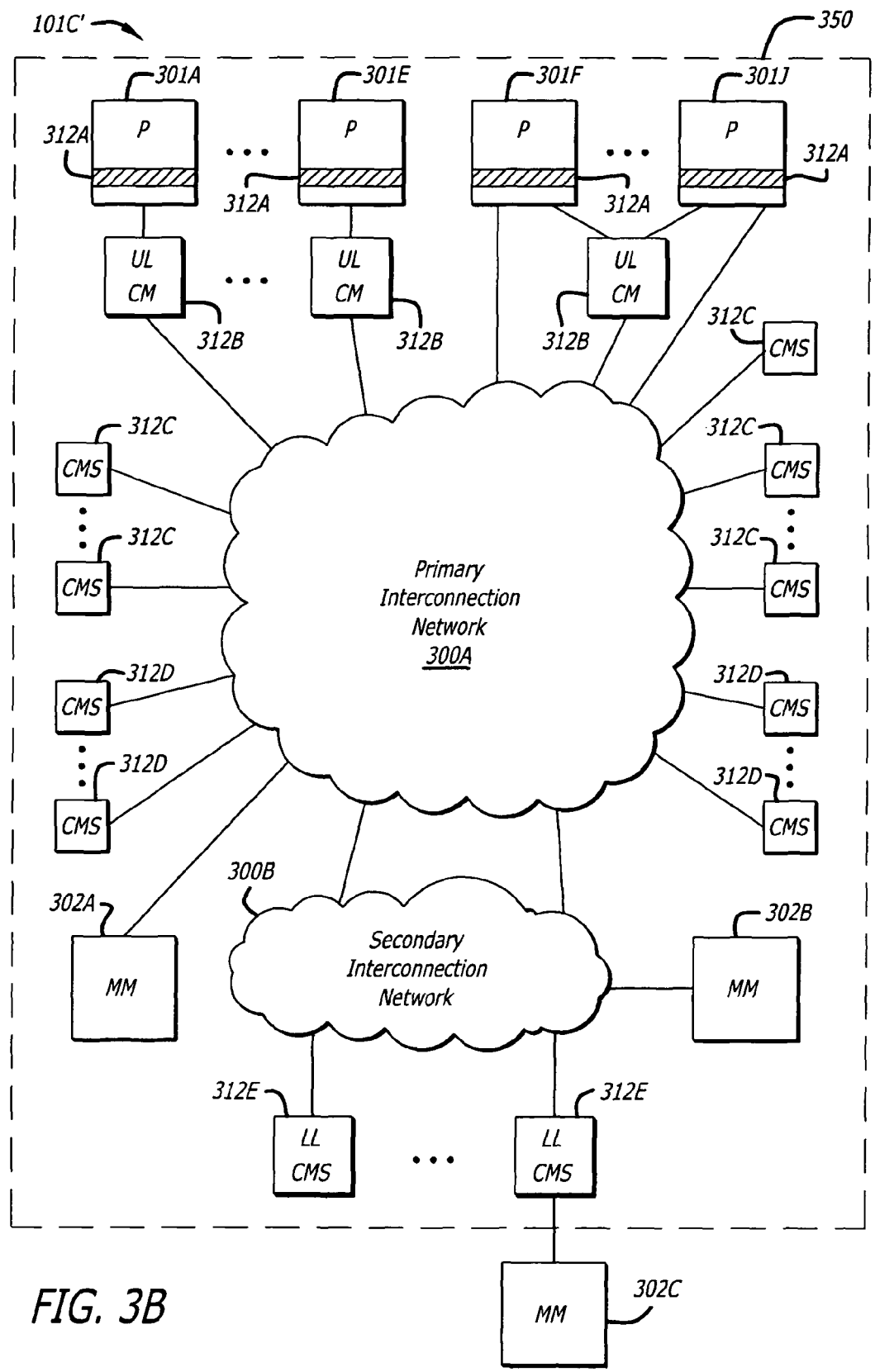
FIG. 3B illustrates a block diagram of another embodiment of a multiprocessor system in which the invention may be utilized.

Referring now to FIG. 3B, a block diagram of a multiprocessor system 101C' is illustrated. FIG. 3B illustrates how a majority of the system 101C of FIG. 3A, including the primary interconnection network 300A, may be part of a single monolithic integrated circuit (IC) chip 350. That is but for the main memory 302C, the elements of the system 101C may be integrated together onto a single silicon chip 350 as illustrated in the system 101C'.

Figure 3C:
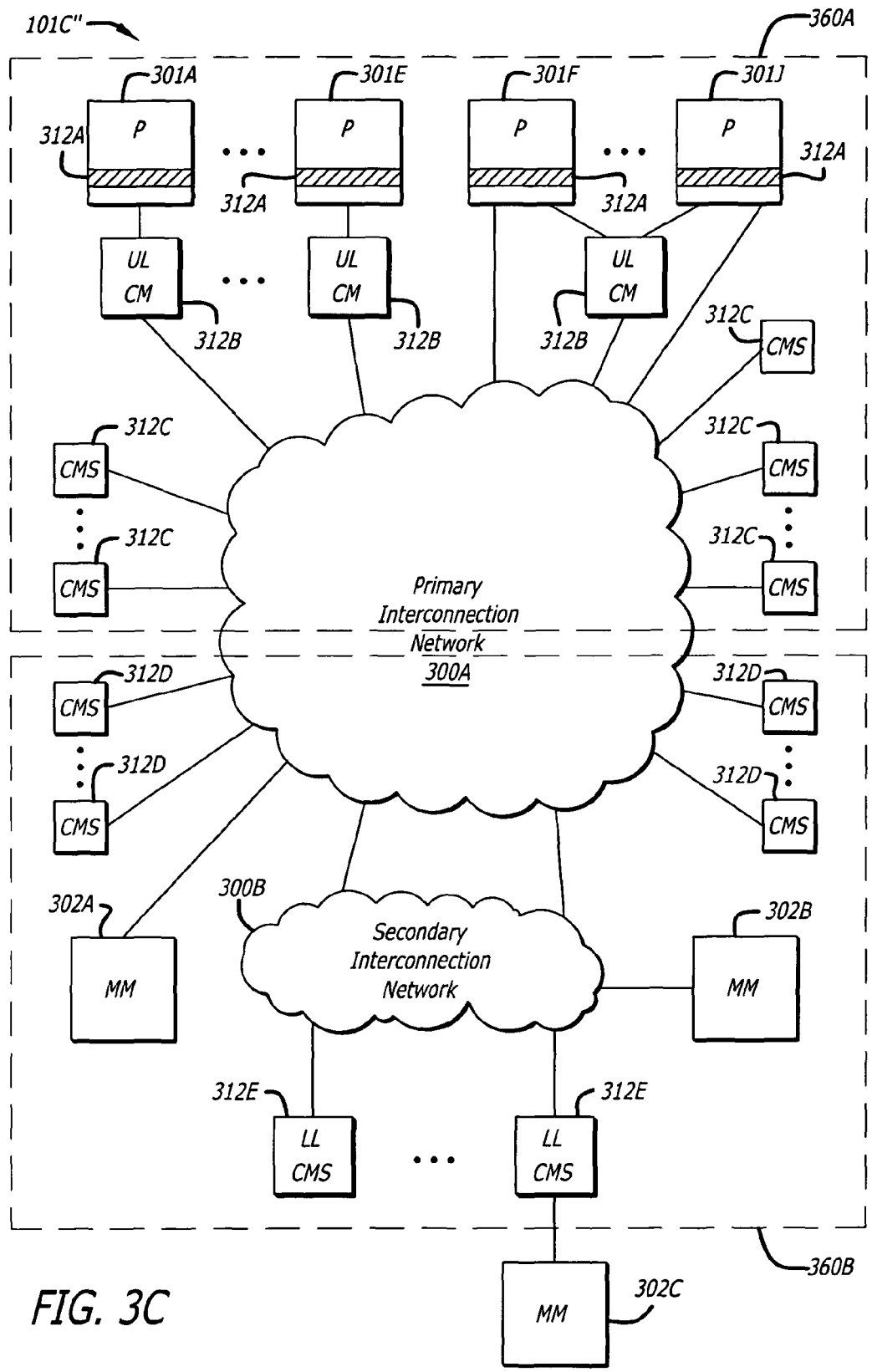
FIG. 3C illustrates a block diagram of another embodiment of a multiprocessor system in which the invention may be utilized.

Referring now to FIG. 3C, a block diagram of a multiprocessor system 101C" is illustrated. FIG. 3C illustrates that the system 101C may be partitioned across integrated circuit boundaries with the primary interconnection network 300A being a part of a plurality of integrated circuit (IC) chips 360A-360B. Elements of the system 101C may be integrated together onto a plurality of silicon chips. Alternatively, elements of the multiprocessor system 101C" may one or more printed circuit boards electrically coupled together such as through a common backplane or traces of a mother-board print circuit board (PCB).

Figure 4:
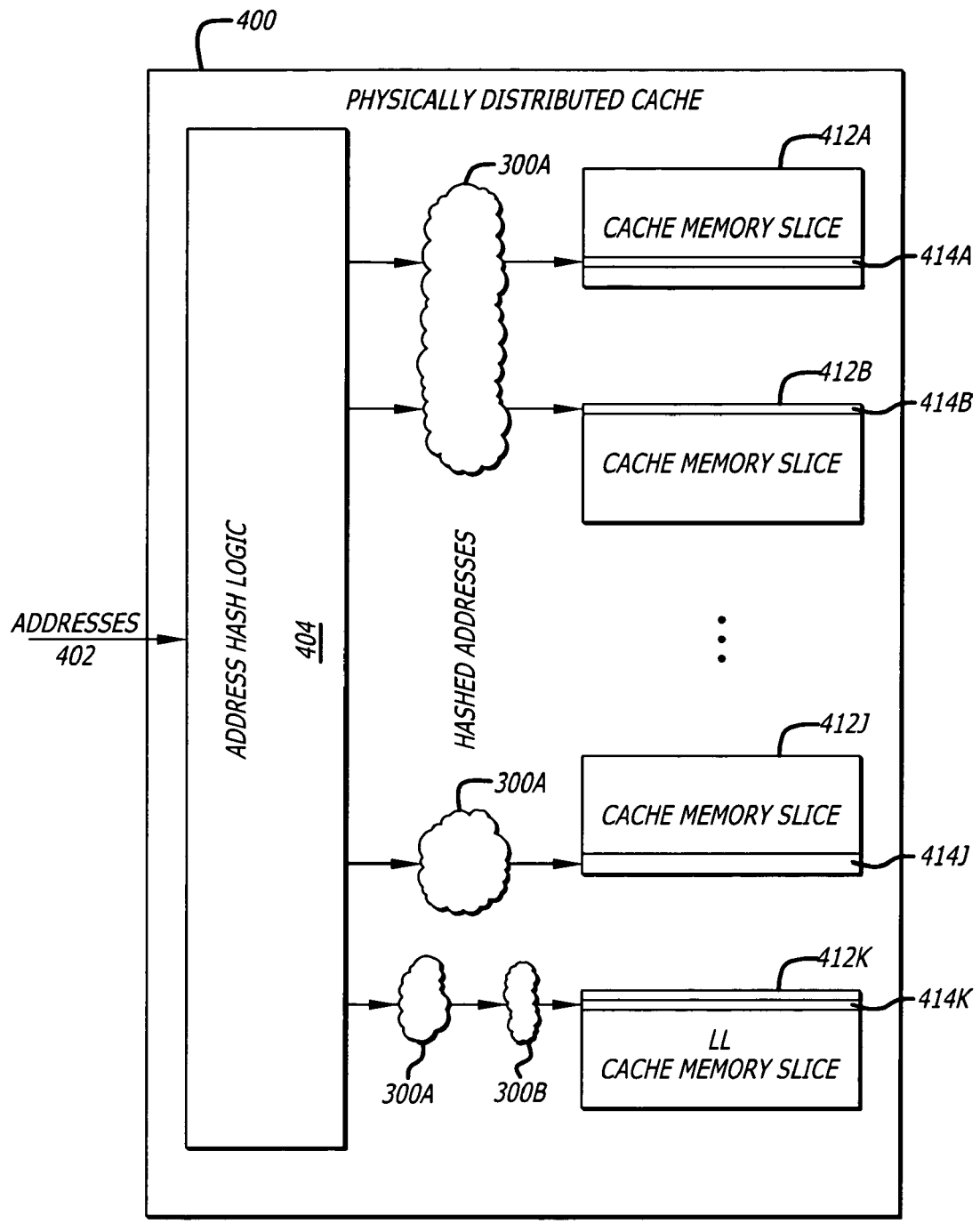
FIG. 4 illustrates a block diagram of a logically shared physically distributed cache memory system.

Referring now to FIG. 4, a logical view of a block diagram of a physically distributed cache memory system 400 is illustrated. The physically distributed cache memory system 400 includes address hash control logic 404 to generate hashed addresses and one or more cache memory slices 412A-412K to receive messages at a hashed address over the primary interconnection network 300A or the primary interconnection network 300A and the secondary interconnection network 300B. Each of the one or more cache memory slices 412A-412K includes one or more blocks of memory cells 414A-414K.

The physically distributed cache memory system 400 is shared by requesters such as processors or cache memories. The physically distributed cache memory system 400 may be partitioned in a number of ways such that one address block of memory cells is associated with one cache memory slice and the next address block of memory cells is associated with another cache memory slice. The addresses 402 from a requester are hashed by address hash logic 404 to select a cache memory slice and one or more blocks of memory cells therein.

Referring now to FIGS. 3A and 4, one or more of the processors 301A-301J can request that an ordered store request be performed by the physically distributed cache memory system 400. Alternatively, one or more cache memories 312A, 312B or cache memory slices at an upper level of the hierarchy of the distributed cache memory system 400 can request that an ordered store request be performed by other levels of the distributed cache memory system 400. The cache memory slices making such requests are typically closer to the processors. The cache memories making such requests may include the internal cache memories 312A of the processors or the upper level cache memories 312B. Collectively, the processors, cache memories, and cache memory slices that request ordered stores may be referred to as requesters. Each requestor has control logic and other hardware elements to generate the ordered stored requests. In the discussions that follow below, "Nc" represents the number of cache memory slices that make up the physically distributed cache and "Np" represents the number of requestors that share the distributed cache.

Figure 7:
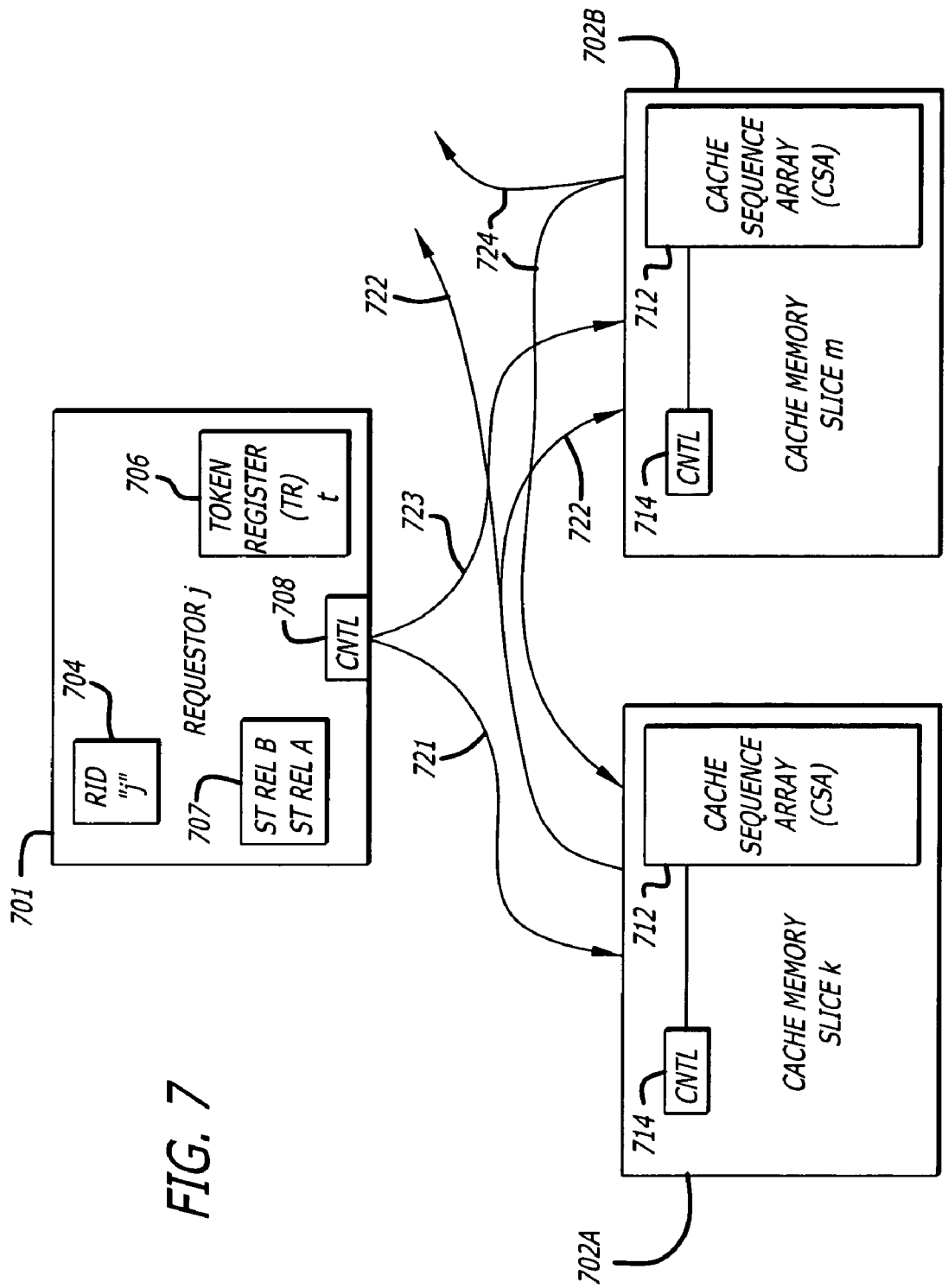
FIG. 7 illustrates a block diagram with an exemplary sequence of in-order execution of an ordered store request.

Referring momentarily to FIG. 7, a processor/cache requester 701 at one level of the memory hierarchy is illustrated communicating with cache memory slices 702A and 702B at a different level of the memory hierarchy which are capable of in-order execution of an ordered store request.

Each processor/cache requestor 701 has a unique requestor identifier ("RID") 704 having a constant value of "j" and a single token register ("TR") 706 having a variable value of "t". The unique requestor identifier may also be referred to as unique requester identification. The token register may also be referred to as a sequence token register and the token value "t" may also be referred to as a store sequence token or a store sequence number. The token register ("TR") 706 is "b" bits wide and can have $2^b$ bit values depending upon the number of outstanding ordered store requests to be supported by the processor/requestor. Let "S" represent the number of outstanding ordered stores that each processor supports, then the number of bits in the token register can be determined from the equation of "b"=ceiling [$\log_2$ (S)]. The value held by the token register may also be referred to as the requestor sequence token. The token register can be incremented as ordered store requests are generated. The token register can wrap around (i.e., roll-over) back to its initial value (typically zero) when it is incremented beyond its maximum value. However in one embodiment, S is sufficiently large, as well as the number of bits "b", in proportion to the maximum Network Latency (i.e., maximum network delay) such that by the time the token register rolls-over, a processor would have processed everything. In another embodiment, the processor/requester with the TR register which is about to roll-over polls each cache memory slice to determine if each has processed all tagged memory requests and reached S−1. If all cache memory slices respond to the processor that they are finished, the processor can then allow its given TR register to roll-over.

The value "j" of the requestor identifier ("RID") 704 is unique. That is no two values of requestor identifiers are the same in the same multiprocessor system with a distributed cache memory system. With the value "j" of each requestor identifier ("RID") 704 being unique, the values "t" of the token registers in each requestor 701 can be made unique by appending "j" and "t" together. That is, we can "uniqify" the token register TR, by adding the requestor identifier to the token, before it is communicated over the interconnection network to the distributed cache memory system.

Each cache memory slice in the memory hierarchy of the distributed cache memory which are capable of in-order execution of an ordered store request, such as cache memory slices 702A and 702B, has a cache sequence array (CSA) 712. The cache sequence array (CSA) 712 is a table with "Np" entries, which are "b" bits wide. The cache sequence array (CSA) 712 determines the identity of the next ordered store that can be processed by the given cache memory slice in the distributed cache system for each requester identifier ("RID") 704. As there are Np requestors, there are Np entries in the cache sequence array (CSA) 712.

Reference is now made to FIGS. 5A-5B. FIG. 5A illustrates a diagram of typical fields of a tagged ordered store request 500. FIG. 5B illustrates a diagram of typical fields of a CSA update 510. To support ordered store requests the bit fields of requester identifier (RID) field 501 (the "j" value), a token register value field 502 (the "t" value), and the message identifier (MID) field 504 are utilized in both the tagged ordered store request 500 and the CSA update 510. The bit fields of requester identifier (RID) field 501 (the "j" value), a token register value field 502 (the "t" value) may collectively be referred to as TRU 503. That is, TRU 504 represents the concatenation of the requester id "j" and the value "t" of requestor j's token register TR. The value of TRU 504 can be denoted as "j.t" where j is the requester identifier and "t" is the value of requester j's token register TR.

The message identifier (MID) field 504 is a code to indicate either an ordered store request (OSR) 504A or a CSA update 504B. Other codes for the message identifier (MID) field 504 may be used to indicate other message types.

If the message identifier field 504 indicates an ordered store request (OSR) code 504A of a tagged ordered store request 500, then and address field 505 and a data field 506 are included as part of the tagged ordered store request 500. In other words, the bit fields of the requestor identifier (RID) field 501 (the "j" value) and the token register value field 502 (the "t" value) are concatenated together and appended to the ordered store request code 504A which includes an address 505 and data 506 which is to be stored. In this manner, the tagged order store request 500 is formed.

If the message identifier field 504 indicates a CSA update code 504B and not an ordered store request (OSR) code 504A, then the address field 505 and the data field 506 are not included in the message sent into the distributed cache memory system 400. In this case, the bit fields of the requestor identifier (RID) field 501 (the "j" value) and the token register value field 502 (the "t" value) are based upon the ordered store request that was processed and are appended to the CSA update code 504B.

In one embodiment, the data bit fields of the tagged ordered store request 500 and the CSA update 510 may flow in packets over the interconnection network 300A, 300B from requester to cache memory slices or from one cache memory slice to other cache memory slices. In another embodiment, the data bit fields of the tagged ordered store request 500 and the CSA update 510 may flow in parallel over a parallel interconnection bus of the interconnection network. In another embodiment, the data bit fields of the tagged ordered store request 500 and the CSA update 510 may flow serially over a serial interconnection of the interconnection network. In yet another embodiment, the data bit fields of the tagged ordered store request 500 and the CSA update 510 may flow by a combination of one or more of packets, parallel or serial over the interconnection network. In either case, the tagged ordered store requests 500 are generated and sent into the interconnection network by the requester and the CSA updates 510 are generated and sent into the interconnection network by the cache memory slice that executed an ordered store request.

Referring now to FIG. 6A, a block diagram of a cache memory slice 602 is illustrated. The cache memory slice 602 illustrates a single instance of a cache memory slice. The cache memory slice 602 includes a cache sequence array 604 and cache control logic 606 to support in-order execution of ordered store requests. The cache control logic 606 can also provide the typical cache control functions associated with cache memories. The cache memory slice 602 further includes a request buffer 608, cache tag bits 610, a cache data array 612, tag match logic 614, and a column select 616 coupled together as shown and illustrated in FIG. 6A.

The request buffer 608 temporarily holds cache storage requests for processing in a queue. The cache tag bits 610 are typically the upper address bits that help identify the contents of a cache line of memory cells along with the valid bits and other status bits. The cache data array 612 is an array of rows and columns of memory cells for storing data. The tag match logic 614 is to determine whether there is a hit or a miss to the given cache memory slice. A hit indicates that the desired data is stored within the cache data array 612 of the given cache memory slice. A miss indicates that the desired data is not stored within the cache data array 612 and that the request needs to be passed onto the next level of hierarchy in the distributed cache memory system. The column select 616 is responsive to the indication of a hit and a miss as to whether or not a column of memory cells should be selected from the cache data array 612.

The cache sequence array 604 allows the cache memory slice 602 to execute ordered store requests in-order across a physically distributed cache memory system. The cache sequence array 604 stores one or more store sequence tokens associated with one or more ordered store requests as cache sequence entries. The cache sequence entry indicates the ordered store request that the cache memory slice 602 can currently execute for each requestor.

Referring now to FIG. 6B, a block diagram of a cache sequence array (CSA) 604 is illustrated. The cache sequence array (CSA) 604 includes a cache sequence array (CSA) table 632. The cache sequence array (CSA) table 632 stores the store sequence tokens t for each requester j. The requester identifier j acts as an address into the cache sequence array (CSA) table 632 to send the data addressed thereby to the cache control logic 606.

Each cache sequence entry in the cache sequence array (CSA) table 632 indicates the current store sequence tag t that the given cache memory slice may execute in-order from a given requester j. If an ordered store request gets hashed to the given cache memory slice 602 that matches the cache sequence entry for that requestor j, then the cache memory slice will execute the ordered store request. If a different ordered store request gets hashed to the given cache memory slice 602 that does not match the cache sequence entry for that requester j, then the cache memory slice will not currently execute the ordered store request but instead keep it stored in the request buffer 608 or other queue for later processing. In this manner, the ordered store request can be executed in-order.

The cache sequence array (CSA) table 632 within a cache memory slice maintains one ordered store request entry for each requestor. In this manner, each cache memory slice can maintain an order of the execution of ordered store requests for each requestor j.

Referring now to FIG. 7, a block diagram illustrating an exemplary sequence of in-order execution of an ordered store request including generating a tagged ordered store request, executing the ordered store request, and issuing a cache sequence update message.

As discussed previously, each processor/cache requester 701 has a unique requester identifier ("RID") 704 having a value of "j" and a single token register ("TR") 706 having a value of "t". Each processor/cache requester 701 further includes a work queue 707 to store ordered store requests (e.g., ST.REL A, ST.REL B) and control logic 708 to control the generation of the tagged ordered store request 500 and hash or translate the address to select the appropriate cache memory slice and memory cells therein.

As discussed previously, each cache memory slice in the memory hierarchy of the distributed cache memory which is capable of in-order execution of an ordered store request has a cache sequence array (CSA). FIG. 7 illustrates cache memory slice k 702A and cache memory slice m 702B having a cache sequence array (CSA) 712.

In operation, requestor j 701 generates a tagged ordered store request 500 using an address of one of the ordered store request found within the queue 707, appending the requester ID j and the current token register value t. The controller 708 of the requestor j 701 issues the tagged ordered store request 500. The ordered store request is tagged with the value "j.t". At time X, the tagged ordered store request for ST.REL A is sent to the cache slice k 702A as indicated by arrow 721. Within requestor j 701, after the tagged ordered store request for ST.REL A is sent to the cache slice k 702A, the token register 706 is incremented to a value of (t+1).

Assume for example that requester j 701 has two ordered store requests denoted "ST.REL A" and "ST.REL B" that it is ready to tag and issue as tagged ordered store requests into the physically distributed cache memory system to different addresses "A" and "B". The ordered store request "ST.REL A" is older than the ordered store request "ST.REL B" and should be processed first to achieve in-order execution. However with the different addresses "A" and "B", the two ordered store requests "ST.REL A" and "ST.REL B" will be processed by different partitions, cache memory slice k 702A and cache memory slice m 702B of the physically distributed cache memory system.

Requestor j 701 first issues a tagged ordered store request to cache memory slice k 702A with the ordered store request "ST.REL A" being tagged with "j.t" as indicated by arrow 721. When cache memory slice k 702A processes this tagged ordered store request it performs the store and then an update. That is, cache memory slice k 702A broadcasts out cache sequence array (CSA) update having "j.x" to all other cache memory slices as indicated by arrow 722. The value of x=t+1. The cache memory slice k 702A increments its own CSA[j] entry corresponding to the requestor j in order to perform the CSA update therein.

Upon receiving the tagged ordered store request for ST.REL A, cache memory slice k 702A determines whether or not it can execute the tagged ordered store request in-order. To do so, the cache slice k 702A looks to its cache sequence array (CSA) 712 and the entry for requester j 701. How a cache memory slice k 702A determines whether or not it can execute a tagged ordered store request in-order is described further below with reference to FIGS. 9A and 9B. Assuming the cache memory slice k 702A determines it can execute the tagged ordered store request in-order, it does so. After the cache memory slice k 702A has processed or executed the tagged ordered store request for ST.REL A, the value of t is incremented to (t+1) and appended with the requestor ID j to generate and issues a CSA update 510 with the value j.t+1 to all other cache memory slices. Arrows 722 indicate the CSA update being sent to all other cache memory slices including the cache memory slice m 702B. This indicates to caches that have received the CSA update, that they can then process a tagged ordered store request having a "j.t+1" value.

Tagged ordered store requests can become out of order at a given cache memory slice for a variety of reasons. For example, a tagged ordered store requests can become out of order because a CSA update was not received in a timely manner at a given cache memory slice. As another example, a tagged ordered store requests can become out of order because another tagged ordered store request was issued before the prior ordered store request was completely processed and a CSA update issued. As yet another example, a tagged ordered store requests can become out of order because a latter tagged ordered store request is received before all CSA updates have been received from other cache memory slices for a given requester j.

Continuing with the example, at time X+e where e is positive, Requestor j issues the tagged ordered store request including the ordered store request "ST.REL B" tagged with "j.(t+1)" to cache memory slice m 702B as indicated by arrow 723. Within requestor j 701, after the tagged ordered store request for ST.REL B is sent to the cache slice m 702B, the token register 706 is incremented to a value of (t+2).

Upon receiving the tagged ordered store request for ST.REL B, cache memory slice m 702B determines whether or not it can execute the tagged ordered store request in-order. To do so, the cache slice m 702B looks to its cache sequence array (CSA) 712 and the entry for requester j 701.

The cache memory slice m 702B checks to see if its entry for CSA[j] for requester j in the CSA 712 is equal to (t+1). Assuming in this case that cache memory slice k 702A has already processed the ordered store request "ST.REL A" and cache memory slice 702B m received the corresponding CSA update, then cache memory slice 702B m (300) can process the "ST.REL B" as its entry for CSA[j] for requester j is equal to (t+1).

However, now assume that requester j issues the ordered store request "ST.REL B" before the CSA update from the cache memory slice k 702A reaches cache memory slice m 702B, then cache memory slice m 702B m holds on to the tagged ordered store request that includes "ST.REL B" in a network or local buffer until that CSA update with the token "j.x" arrives. In this case, the CSA update is out of order and the cache memory slice has to appropriately handle the ordered store requests it has for processing.

Assuming the cache memory slice m 702B determines it can execute the tagged ordered store request in-order, it does so. After the cache memory slice m 702B has processed or executed the tagged ordered store request for ST.REL B, the value of (t+1) is incremented to (t+2) and appended with the requester ID j to generate and issue a CSA update 510 with the value j.t+2 to all other cache memory slices. Arrows 724 indicate the CSA update being sent to all other cache memory slices including the cache memory slice m 702A. This indicates to caches that have received the CSA update, that they can then process a tagged ordered store request having a "j.t+2" value.

Assuming the cache memory slice m 702B had not received a CSA update with a value of "j.t+1", it would have been unable to execute a tagged ordered store request with a value of "j.t+1" in order. The cache memory slice m 702B would have had to wait until receiving a CSA update with a value of "j.t+1" before it could execute a tagged ordered store request with a value of "j.t+1".

Figure 8:
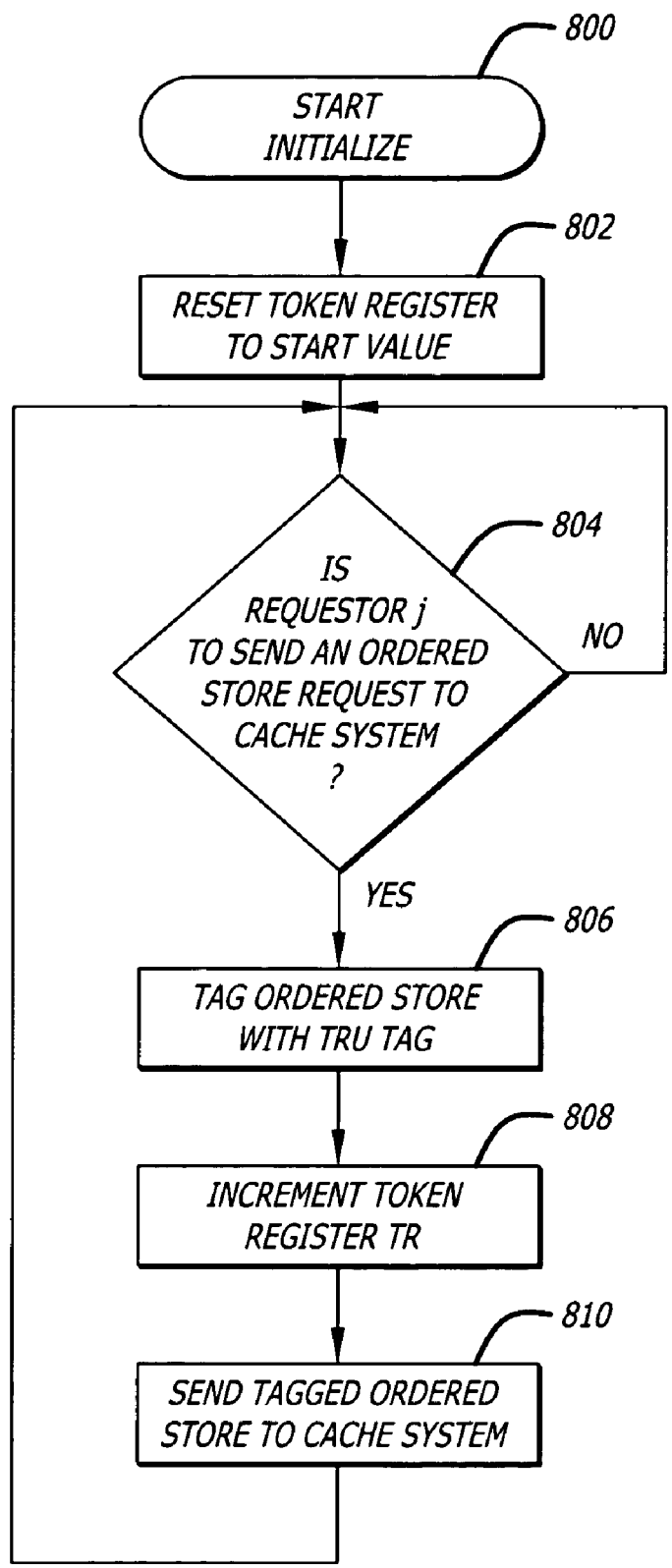
FIG. 8 illustrates a flow chart of control functions performed by the control logic of a requester to support tagged ordered store requests.

Referring now to FIG. 8, a flow chart of control functions performed by the control logic 708 of requestor j 701 to support tagged ordered store requests. In this discussion, as was discussed previously; the number "Np" represents the number of processors that share the distributed cache.

At 800, the system is initialized or reset. At 802, all processor and cache requesters j 701 set their token registers TR 706 and the token value "t" to a starting value, such as zero. As will be discussed further below, all entries of the cache sequence array in each cache memory slice, such as cache sequence array 712 in cache memory slices 702A, 702B, are similarly set to the same initial starting value for "t", such as zero.

At 804, the control logic determines if requestor j 701 is prepared to send an ordered store request into the physically distributed cache memory system. If not the control logic loops back around to 804, essentially waiting for the issuance of an ordered store request. If an ordered store request is to be sent to the physically distributed cache memory system for processing, then the control logic goes to 806.

At 806, the ordered store request is tagged with the current value of the TRU tag 503 including the RID "j" 501 and the token register value "t" 502 as illustrated in FIG. 5A. The value of the TRU tag 503 is denoted as "j.t". The control logic then goes to 808.

At 808, the control logic 708 of the requestor j 701 increments the token register TR 706 so that the current value of t is assigned the value of t+1 for later use with the next ordered store request. The control logic then goes to 810.

At 810, the tagged ordered store request 500 is issued to the physically distributed cache memory system. The address of the tagged ordered store request is hashed and the tagged ordered store request is sent to an appropriate cache memory slice, such as cache memory slice k 702A.

Figure 9A:
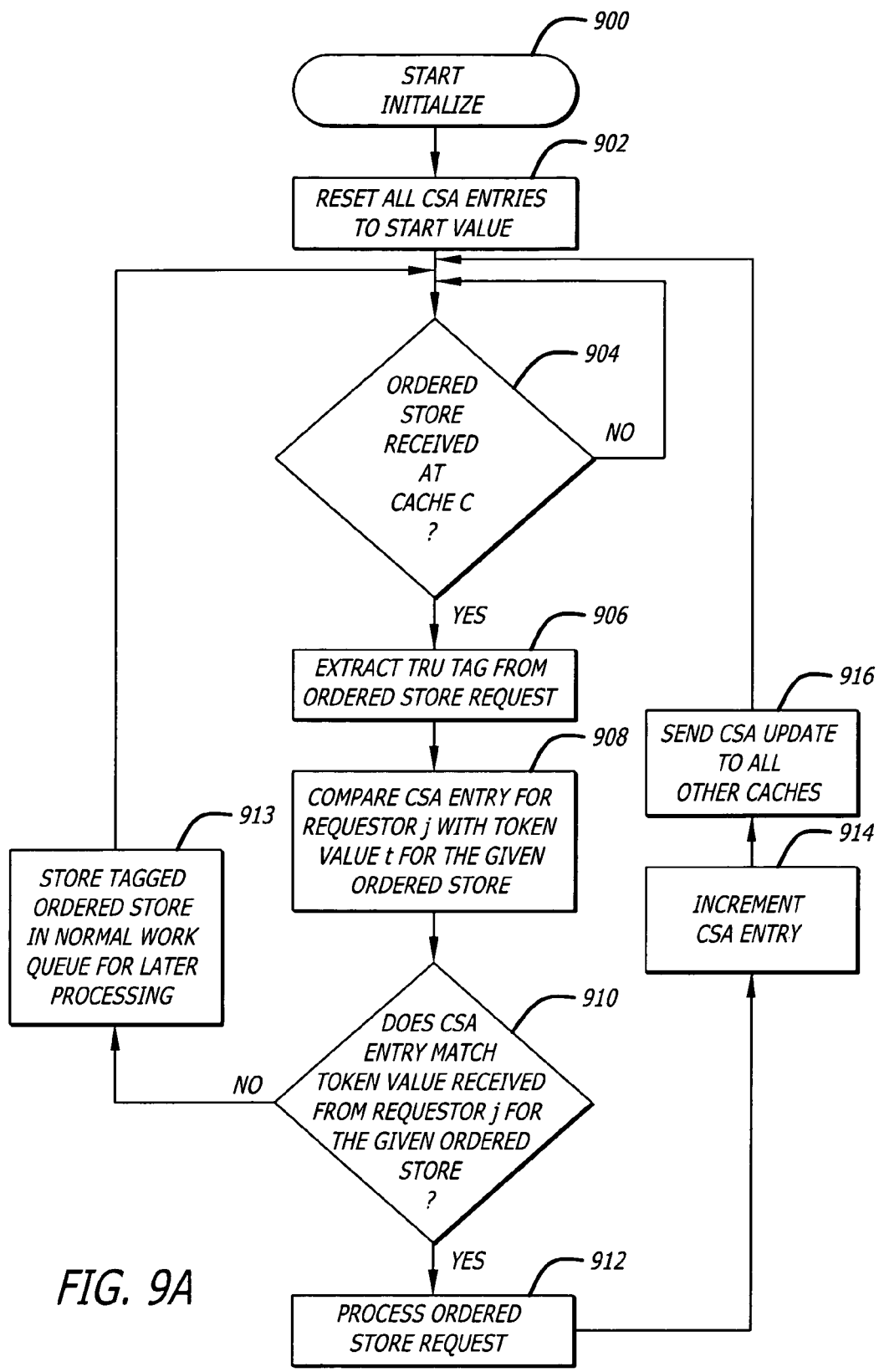
FIG. 9A illustrates a flow chart of control functions performed by the control logic of each cache memory slice to whether or not ordered store requests can be processed.
Figure 9B:
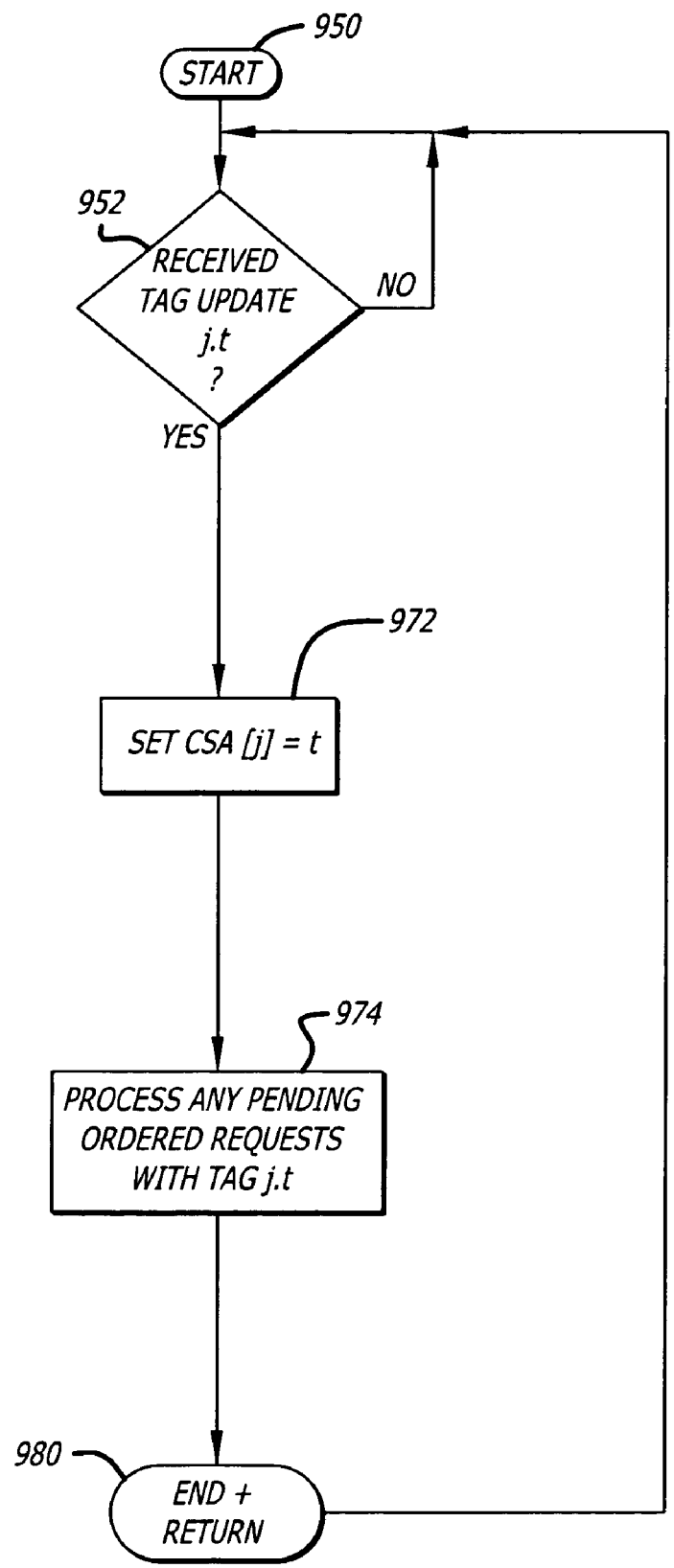
FIG. 9B illustrates a flow chart of control functions performed by control logic of each cache memory slice for handling tag updates.

FIG. 9A is a first flow chart of control functions performed by the control logic 714 of each cache memory slice to support tagged ordered store requests. FIG. 9B is a second flow chart of control functions performed by the control logic 714 of each cache memory slice to support tagged ordered store requests.

Referring now to FIG. 9A, a flow chart of control functions performed by the control logic 714 of each cache memory slice is illustrated for determining whether or not ordered store requests can be processed. At 900, the system is initialized or reset as was previously discussed at 800. At 902, all entries of the cache sequence array 712 in each cache memory slice are set to an initial starting value for "t", such as zero. This matches the starting token value "t" that each requester j 701 has for its token register TR 706. The control logic then goes to 904.

At 904, the control logic of each cache memory slice determines if it has received a tagged ordered store request 501 from a requester. If not, the control logic loops back around to 904, essentially waiting for the receipt of a tagged ordered store request. If a tagged ordered store request has been received for processing, then the control logic goes to 906.

At 906, the TRU tag j.t is extracted from the tagged ordered store request to determine if the ordered store request can be processed by the given cache memory slice. For the value of the received requestor identifier "j", the cache memory slice reads the cache sequence entry for the processor that made the ordered store request value, the value CSA [j] where j takes on values from 0 through (S−1), assuming a start value of zero. Recall that "S" represents the number of outstanding ordered stores that each processor supports.

At 908, the CSA[j] entry, the expected sequence number, for the requester j is compared with the "t" part of the tag in the ordered store request. If CSA [j] matches the "t" part of the tag in the ordered store request, then the request can be processed. If CSA [j] does not equal the "t" part of the tag, the tag does not match, and the control logic goes to 913. If CSA [j] equals the "t" part of the tag, the tag does matches, and the control logic goes to 912.

At 913, the corresponding tagged ordered store request (including the tag) is stored in the cache's normal work queue for later processing.

At 912, when there is a tag match (CSA[j]=t), the cache processes the ordered store request and then goes to 914.

At 914, the CSA [j] entry is incremented for the given requestor and then the control logic goes to 916.

At 916, a CSA update is issued to all other cache memory slices. The given cache memory slice that processed the tagged ordered store requests issues the token j.(t+1) to all other cache memory slices in the system indicating that they can process messages from requestor j (if they have one to process) that correspond to tokens valued t+1. The requester also increments its own token and checks its work queue for any matching requests after a CSA update.

The handling of out of order CSA updates is now described. As discussed previously, the network of physically distributed cache memory slices can reorder tagged ordered store requests so that they can be processed in-order. However, the network of physically distributed cache memory slices can also reorder CSA updates that are received by each cache memory slice as well.

Referring momentarily back to FIG. 7, consider for example that cache memory slice 702A sends out two CSA updates including tag updates j.(t+1) and j.(t+2) in quick succession to the nearby caches, and they arrive out of order at cache memory slice 702B. Assume further that cache memory slice 702B has tagged ordered store requests that require waiting for the CSA updates including the tag updates j.(t+1) and j.(t+2) but that it receives only one CSA update specifying the tag update j.t+2 from cache memory slice 702A. In this scenario, the CSA update is out of sequence.

When a cache memory slice receives the tag updates in the CSA update messages out of sequence—say it receives tag update j.t+5 before it receives tag updates j.t+1, j.t+2, j.t+3, and j.t+4—some other cache memory slice had to have received j.t+1 in-order to generate j.t+2 and to trigger j.t+3, and so on in-order to trigger the issuance of a tag update j.t+5. So if a cache memory slice receives a tag update j.t+n without receiving the earlier updates, it is safe for a cache to process all ordered stores up to and including j.t+n upon receipt of the tag update j.t+n.

The addition operation of t+n is performed modulo $2^b$, where b is the number of bits in the counter part of the tag.

Due to the counter having a limited number of b bits, the addition operation may exceed the maximum counter value and rollover to a lower value. Care should be taken to avoid negative effects of a rollover condition. In one embodiment, the number of bits "b" is sufficient in proportion to the maximum Network Latency (i.e., maximum network delay) such that by the time the token register rolls-over, a processor would have processed all prior ordered store requests. In another embodiment, the processor/requester with the TR register which may roll-over polls each cache memory slice to determine if each has processed all tagged memory requests and reached S−1. If all cache memory slices respond to the processor that they are finished, the processor can then allow its given TR register to roll-over.

The TR counter in each requestor is of a limited number of bits, "b" bits, and it correspondingly generates tags with "b" bits. That is, the maximum counter value and "t" of a tag is $2^b-1$ Assume the cache memory slice k 702A receives a CSA update with a tag of j.$2^b-2$ but does not receive any other CSA update including those with a tag value from j.0 through j.$2^b-3$. Further assume that cache memory slice k 702A processes all of its ordered store requests and the sends out a CSA update with a tag update of j.$2^b-1$. The issuance of the CSA update with a tag update of j.$2^b-1$ may trigger another cache memory slice, such as cache memory slice m 702B, to process a tagged ordered store request having j.$2^b-1$ without waiting for any other CSA update. Subsequently the cache memory slice m 702B may issue a CSA update message with an update tag of j.0 as tag j.0 is the next counter value after j.$2^b-1$.

Referring now to FIG. 9B, a flow chart of control functions performed by control logic of the cache memory slice is illustrated for handling tag updates.

At 950, the CSA update routine performed by the control logic of each cache memory slice is initialized on power-up or reset.

At 952, the control logic determines if the cache memory slice has received a CSA update message with a tag update j.t. If not the control logic loops back around to 952, essentially waiting for the receipt of a tag update. If CSA update message with a tag update j.t has been received, then the control logic goes to 972.

At 972, the control logic updates the current entry into the cache sequence array table by setting CSA[j] equal to t. Next at 974, the control logic causes the cache memory slice to process any pending ordered store requests with a tag of "j.t". After processing the ordered store requests, at 980 the control logic returns to 952 to wait and receive the next update.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, it is possible to implement the invention or some of its features in hardware, firmware, software or a combination thereof where the software is provided in a processor readable storage medium such as magnetic, optical, or semiconductor storage.

What is claimed is:

1. A physically distributed cache memory system comprising:
    an interconnection network;
    first level cache memory slices coupled with the interconnection network to generate tagged ordered store requests, each tagged ordered store request having a tag including a requestor identification and a store sequence token, wherein each of the first level cache memory slices has a unique requestor identification and a sequence token register to generate the tagged ordered store requests; and
    second level cache memory slices coupled with the interconnection network to execute ordered store requests in-order across the physically distributed cache memory system to maintain a coherency of the physically distributed cache memory system without requiring interprocessor communications in response to each tag of the tagged ordered store requests, wherein the second level cache memory slices to request reordering of any tagged ordered store requests that are received out of order by at least one of the second level cache memory slices, wherein the second level cache memory slices are further to request reordering of any cache sequence array updates associated with the out of order tagged ordered store requests, wherein a cache sequence array is capable of identifying a next tagged ordered store request to be received at the second level cache memory slices.

2. The physically distributed cache memory system of claim 1, wherein each of the second level cache memory slices has a cache sequence array to execute the ordered store requests in-order across the physically distributed cache memory system.

3. The physically distributed cache memory system of claim 2, wherein the cache sequence array includes a cache sequence array table to store the store sequence token associated with ordered store requests as a cache sequence entry, the cache sequence entry to indicate one or more ordered store requests that the cache memory slice is capable of executing.

4. The physically distributed cache memory system of claim 2, wherein each of the second level cache memory slices further has control logic coupled to the cache sequence array, the control logic to control the in-order execution of the ordered store requests and to generate a cache sequence array update to update the second level cache memory slices.

5. The physically distributed cache memory system of claim 1, wherein the first level of cache memory slices are each coupled to a processor to generate the tagged ordered store requests.

6. The physically distributed cache memory system of claim 5, wherein the processor includes an internal cache memory to generate the tagged ordered store requests.

7. The physically distributed cache memory system of claim 1, further comprising:
    an upper level cache memory coupled to one or more processors.

8. The physically distributed cache memory system of claim 7, wherein the one or more processors include an internal cache memory to generate the tagged ordered store requests.

9. The physically distributed cache memory system of claim 7, wherein the upper level cache memory generates the tagged ordered store requests.

10. A method comprising:
    ordering store requests in a distributed cache memory system to maintain a coherency of the distributed cache memory system:
        appending a tag to an ordered store request indicating a requestor identification and a store sequence number;
        sending the tagged ordered store request to a cache memory slice in the distributed cache memory system;

comparing the store sequence number with an expected sequence number associated with the requestor identification; and if the store sequence number matches the expected sequence number, then executing the ordered store request, wherein one or more of the tagged ordered store requests are received out of order by the cache memory slice, wherein the cache memory slice to request reordering of the one or more out of order tagged ordered store requests with respect to other tagged ordered store requests, wherein the cache memory slice is further to request reordering of any cache sequence array updates associated with the one or more out of order tagged ordered store requests, wherein a cache sequence array is capable of identifying a next tagged ordered store request to be received at the cache memory slice.

11. The method of claim 10 further comprising:

if the store sequence number does not match the expected sequence number then storing the tagged ordered store request for later execution.

12. The method of claim 10 further comprising:

in response to executing the ordered store request, updating the expected sequence number associated with the requestor identification.

13. The method of claim 10 further comprising:

prior to executing the ordered store request, determining if prior ordered store requests made by the requestor have been executed, and if so then executing the ordered store request.

14. The method of claim 13, wherein the determining determines if the store sequence numbers associated with the prior ordered store requests and the requestor identification have been received by the cache memory slice to execute the ordered store request.

15. The method of claim 13, wherein it is determined that not all prior ordered store requests made by the requestor have been executed, and the execution of the current ordered store is delayed until all prior ordered store requests are executed.

16. A processing unit including:

a plurality of processors, each of the processors including one or more levels of processor cache memory;

a distributed cache memory system coupled to the plurality of processors, the distributed cache memory system including:

a primary interconnection network, and a plurality of cache memory slices coupled with the primary interconnection network; and a plurality of cache memories coupled between the plurality of processors and the primary interconnection network of the distributed cache memory system;

wherein the processors and cache memories have a unique requestor identification and a sequence token register to generate a tag to append to ordered store requests for the plurality of cache memory slices of the distributed cache memory system, the tag including a requestor identification and a sequence token associated with the requestor identification; and wherein each cache memory slice has a cache sequence array to execute the ordered store requests in-order across the distributed cache memory system to maintain a coherency of the distributed cache memory system, wherein one or more of the ordered stored requests are received out of order by a cache memory slice, wherein the cache memory slice to request reordering of the one or more out of order tagged ordered store requests, wherein the cache memory slice is further to request reordering of any cache sequence array updates associated with the one or more out of order tagged ordered store requests, wherein the cache sequence array is capable of identifying a next tagged ordered store request to be received at the cache memory slice.

17. The processing unit of claim 16 wherein the cache sequence array includes a cache sequence array table to store the sequence tokens associated with ordered store requests as a cache sequence entry, the cache sequence entry to indicate the ordered store request that the cache memory slice is capable of executing.

18. The processing unit of claim 17 wherein one of the cache memory slices of the plurality of cache memory slices receives an ordered store request having a sequence token matching a cache sequence entry for the given requestor indicating that it is in-order, and the one cache memory slice executes the current ordered store request.

19. The processing unit of claim 18 wherein the one cache memory slice to further update the cache sequence entry in the plurality of cache memory slices.

20. The processing unit of claim 17 wherein one of the cache memory slices of the plurality of cache memory slices receives an ordered store request having a sequence token that does not match a cache sequence entry for the given requestor indicating that it is out of order, and the one cache memory slice stores the current ordered store request for later execution in-order with other ordered store requests.

21. A computer system including:

an input/output device;

a random access memory; and a plurality of processors coupled to the random access memory and the input/output device;

a distributed cache memory system coupled to the plurality of processors, the distributed cache memory system including a plurality of cache memory slices; and a plurality of cache memories coupled to the plurality of processors;

wherein the processors and cache memories have a unique requestor identification and a sequence token register to generate a tag to append to ordered store requests for the plurality of cache memory slices of the distributed cache memory system, the tag including a requestor identification and a sequence token associated with the requestor identification; and wherein each cache memory slice has a cache sequence array to execute the ordered store requests in-order across the distributed cache memory system to maintain a coherency of the physically distributed cache memory system, wherein one or more of the ordered stored requests are received out of order by a cache memory slice, wherein the cache memory slice to request reordering of the one or more out of order tagged ordered store requests, wherein the cache memory slice is further to request reordering of any cache sequence array updates associated with the one or more out of order tagged ordered store requests, wherein the cache sequence array is capable of identifying a next tagged ordered store request to be received at the cache memory slice.

22. The computer system of claim 21 wherein one of the plurality of cache memory slices receives an ordered store request having a sequence token matching a cache sequence entry for the given requestor indicating that it is in-order, and the one cache memory slice executes the current ordered store request.

23. The computer system of claim 22 wherein the one cache memory slice to further update the cache sequence entry in the plurality of cache memory slices.

24. The computer system of claim 21 wherein an ordered store request is a store request of a requestor that anticipates execution in-order with respect to other ordered requests of the requestor.

25. The computer system of claim 24 wherein earlier ordered store requests anticipate processing before a current ordered store request is processed.

26. The computer system of claim 23 wherein a non-ordered store request is a store request of a requestor that is capable of being executed out of order with respect to other ordered requests of the requestor.

27. A multiprocessor comprising:
an integrated circuit including
an interconnection network;
a plurality of processors coupled to the interconnection network to couple tagged ordered store requests into the interconnection network, each tagged ordered store request having a tag including a requestor identification and a store sequence token; and
a plurality of second level cache memory slices coupled with the interconnection network to execute ordered store requests from the plurality of processors in-order to maintain a coherency of the physically distributed cache memory system without requiring interprocessor communications in response to each tag of the tagged ordered store requests,
wherein the plurality of second level cache memory slices coupled with the interconnection network form a distributed cache memory system shared by the plurality of processors, wherein one or more of the tagged ordered store requests are received out of order by a second level cache memory slice, wherein the second level cache memory slice to request reordering of the one or more out of order tagged ordered store requests, wherein the second level cache memory slice is further to request reordering of any cache sequence array updates associated with the one or more out of order tagged ordered store requests, wherein a cache sequence array is capable of identifying a next tagged ordered store request to be received at the second level cache memory slice.

28. The multiprocessor of claim 27 wherein an ordered store request is a store request that anticipates execution in-order with respect to other ordered requests of the processor.

29. The multiprocessor of claim 28 wherein earlier ordered store requests anticipate processing before a current ordered store request is processed.

30. The multiprocessor of claim 28 wherein an unordered store request is a store request that is capable of being executed out of order with respect to other ordered requests.

31. The multiprocessor of claim 27, wherein each of the plurality of cache memory slices has a cache sequence array to execute the ordered store requests in-order across the interconnection network.

32. The multiprocessor of claim 31, wherein the cache sequence array includes a cache sequence array table to store the store sequence token associated with ordered store requests as a cache sequence entry, the cache sequence entry to indicate the ordered store request that the cache memory slice is capable of executing.

33. The physically distributed cache memory system of claim 1, wherein the size of each store sequence token is at least partially based on the number of outstanding tagged ordered store requests supported by the second level cache memory slices.

34. The computer system of claim 21, wherein the size of each sequence token is at least partially based on the number of outstanding tagged ordered store requests supported by each cache memory slice.

* * * * *

UNITED STATES PATENT AND TRADEMARK OFFICE
CERTIFICATE OF CORRECTION

| | | |
|---|---|---|
| PATENT NO. | : 8,117,392 B2 | |
| APPLICATION NO. | : 10/691176 | |
| DATED | : February 14, 2012 | |
| INVENTOR(S) | : Charney et al. | |

It is certified that error appears in the above-identified patent and that said Letters Patent is hereby corrected as shown below:

On the Title Page item (57), line 6, after, -- including -- delete "requester" -- and insert -- requestor --.

In the Specification

In column 2, at line 8 delete, "requester" and insert -- requestor --.

In column 2, at line 33 delete, "(the "requester")" and insert -- the ("requestor") --.

In column 2, at line 38 delete, "requester" and insert -- requestor --.

In column 2, at line 41 delete, "requester" and insert -- requestor --.

In column 2, at line 45 delete, "requester" and insert -- requestor --.

In column 2, at line 46 delete, "requester" and insert -- requestor --.

In column 2, at line 51 delete, "requester" and insert -- requestor --.

In column 2, at line 53 delete, "requester" and insert -- requestor --.

In column 6, at line 13 delete, "requesters" and insert -- requestors --.

In column 6, at line 19 delete, "requester" and insert -- requestor --.

In column 6, at line 35 delete, "requesters" and insert -- requestors --.

In column 6, at line 43 delete, "requester" and insert -- requestor --.

In column 6, at line 51 delete, "requester" and insert -- requestor --.

In column 7, at line 27 delete, "requester" and insert -- requestor --.

Signed and Sealed this
Fifth Day of August, 2014

Michelle K. Lee
*Deputy Director of the United States Patent and Trademark Office*

In column 7, at line 34 delete, "requester" and insert -- requestor --.

In column 7, at line 38 delete, "requester" and insert -- requestor --.

In column 7, at line 41 delete, "requester" and insert -- requestor --.

In column 7, at line 43 delete, "requester" and insert -- requestor --.

In column 7, at line 44 delete, "requester" and insert -- requestor --.

In column 8, at line 3 delete, "requester" and insert -- requestor --.

In column 8, at line 17 delete, "requester" and insert -- requestor --.

In column 8, at line 60 delete, "each requester j. The requester" and insert -- each requestor j. The requestor --.

In column 8, at line 67 delete, "requester" and insert -- requestor --.

In column 9, at line 21 delete, "requester" and insert -- requestor --.

In column 9, at line 22 delete, "requester" and insert -- requestor --.

In column 9, at line 24 delete, "requester" and insert -- requestor --.

In column 9, at line 38 delete, "requester" and insert -- requestor --.

In column 9, at line 47 delete, "requester" and insert -- requestor --.

In column 10, at line 8 delete, "requester" and insert -- requestor --.

In column 10, at line 35 delete, "requester" and insert -- requestor --.

In column 10, at line 47 delete, "requester" and insert -- requestor --.

In column 10, at line 49 delete, "requester" and insert -- requestor --.

In column 10, at line 54 delete, "requester" and insert -- requestor --.

In column 10, at line 56 delete, "requester" and insert -- requestor --.

In column 11, at line 3 delete, "requester" and insert -- requestor --.

In column 11, at line 23 delete, "requesters" and insert -- requestors --.

In column 11, at line 64 delete, "requester" and insert -- requestor --.

In column 12, at line 3 delete, "requester" and insert -- requestor --.

In column 12, at line 17 delete, "requester" and insert -- requestor --.

In column 12, at line 36 delete, "requester" and insert -- requestor --.